United States Patent [19]
Fabeck

[11] 3,832,921
[45] Sept. 3, 1974

[54] 2-WAY ADJUSTABLE TOOL BLOCK

[75] Inventor: Richard J. Fabeck, Union Lake, Mich.

[73] Assignee: Carmet Company, Pittsburgh, Pa.

[22] Filed: June 26, 1973

[21] Appl. No.: 373,815

[52] U.S. Cl..................... 82/1 A, 82/24 A, 408/151
[51] Int. Cl........................ B23b 3/00, B23b 21/00
[58] Field of Search .............. 82/1.4, 24 A; 408/151

[56] References Cited
UNITED STATES PATENTS

| | | | |
|---|---|---|---|
| 2,833,169 | 5/1958 | Briney, Jr. et al. | 408/151 |
| 3,125,903 | 3/1964 | Briney, Jr. et al. | 408/151 |
| 3,233,480 | 2/1966 | Briney, Jr. et al. | 408/151 |
| 3,654,826 | 4/1972 | Gersch | 82/1 A |

Primary Examiner—Harrison L. Hinson
Attorney, Agent, or Firm—Vincent G. Gioia; Robert F. Dropkin

[57] ABSTRACT

An adjustable tool block assembly includes a housing, a rotatable eccentric sleeve mounted in the housing and a tool mounted on the axis of the internal surface of the sleeve. A clamp surrounds a portion of the rear end of the sleeve and is moved between operative and inoperative positions by a fluid motor. A second fluid motor moves the clamp when in operative position and hence, rotates the sleeve to change the effective cutting radius of the tool.

6 Claims, 7 Drawing Figures

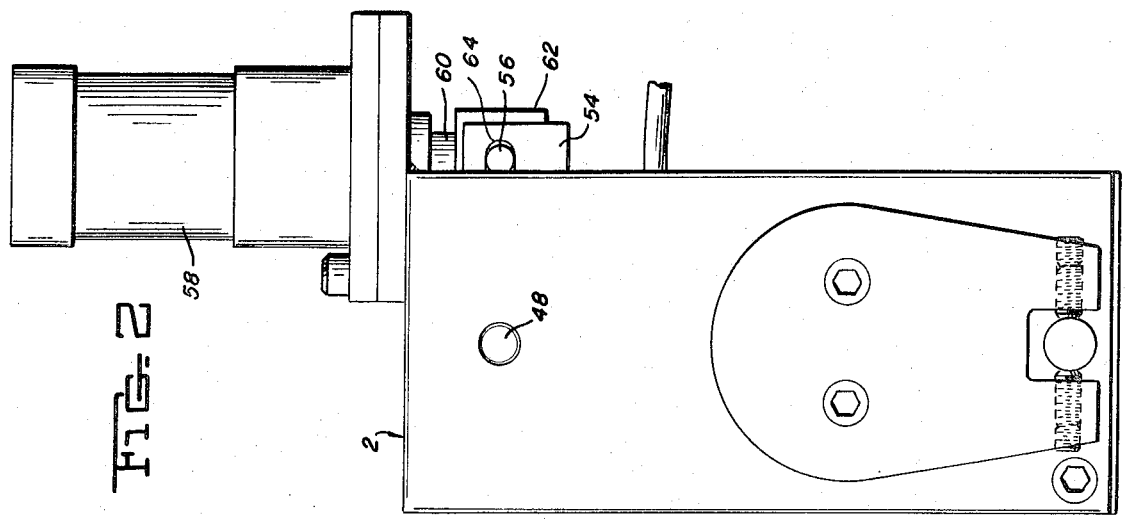
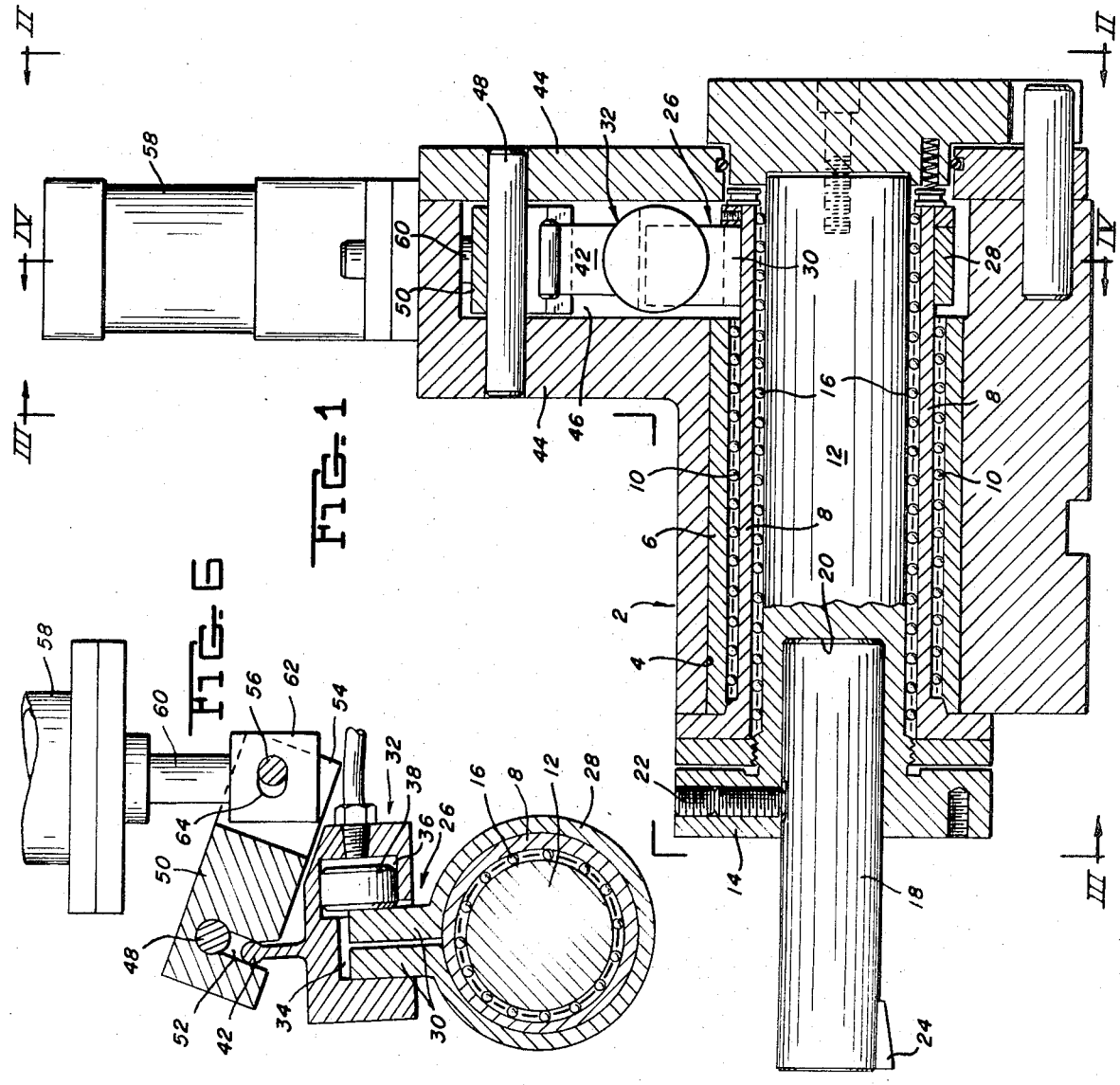

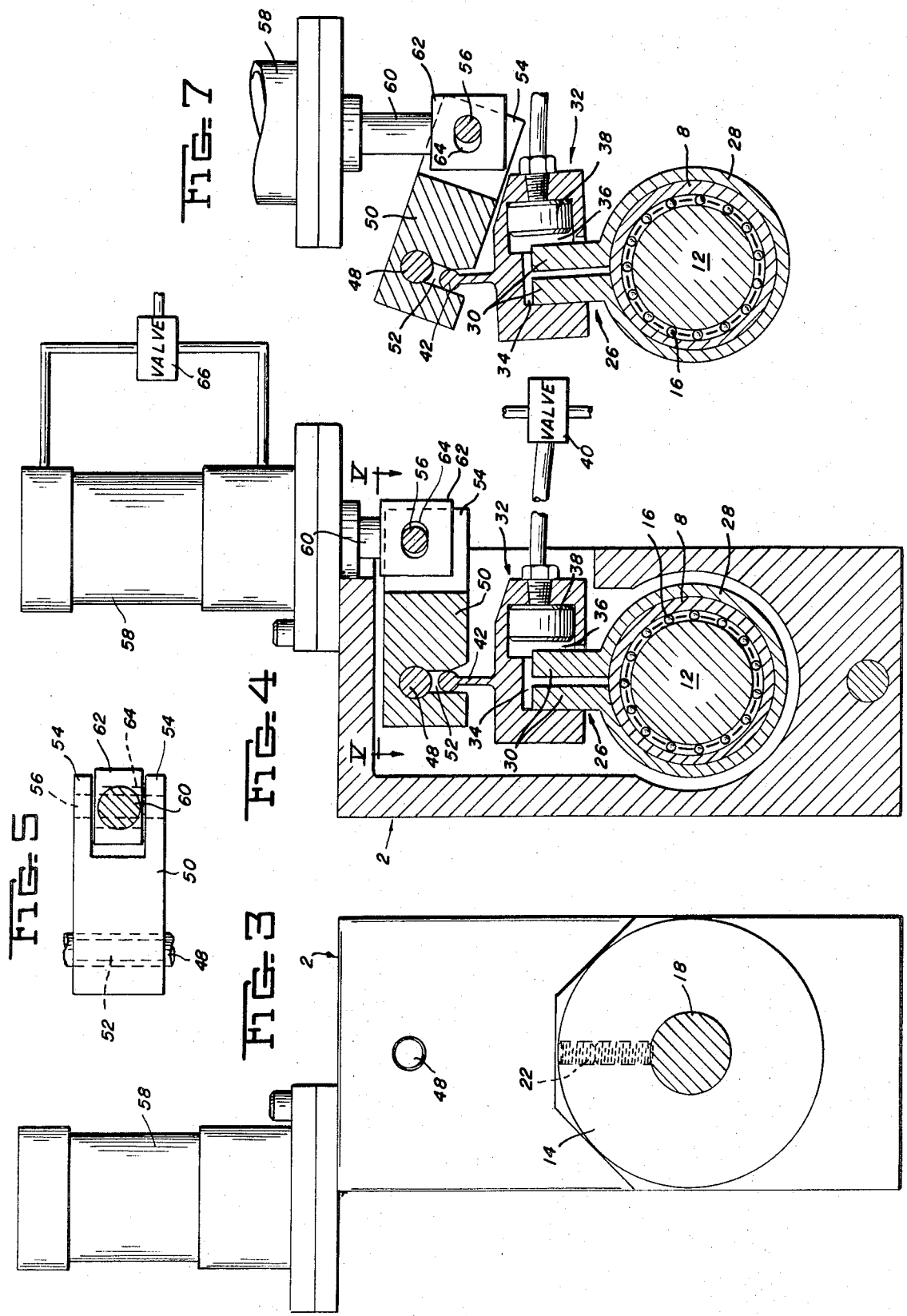

2-WAY ADJUSTABLE TOOL BLOCK

This invention relates to an adjustable tool block assembly and more particularly to apparatus for adjusting the radial position of the cutting tool mounted on a boring bar of a precision boring machine. The invention is also applicable to other machines where adjustment cannot be made manually because of inaccessibility of the equipment. In precision boring machines of one particular type, adjustment for wear and other diameter changes is accomplished by pivoting the boring bar around an eccentric axis. This may be done manually or by means such as shown in Gersch Pat. No. 3,654,826 dated Apr. 11, 1972 and it is to this type of tool that my invention is particularly directed. The adjustment must be made both to increase and to decrease the cutting diameter and the device of the Gersch patent has the disadvantage that it employs a gear drive for rotating an eccentric sleeve to provide the adjustment. While the adjustment is accurate when moving the cutting tool in one direction such as to increase the diameter of cut, the backlash of the gear drive causes inaccuracy when the cutting tool is moved in the opposite direction such as to decrease the diameter of cut. In precision tools in particular the tolerance is very close and since the Gersch device determines the tool position from the rotation of the motor, the actual location of the cutting tool because of the backlash can vary from the indicated location an amount equal to a substantial percentage of the tolerance. Thus, little room for other errors remains with the result that the machining operation is less accurate and workpieces are sometimes obtained which must be rejected as outside the customer's tolerance. The gear drive also generally requires lubrication.

It is, therefore, an object of my invention to provide an adjustable tool block assembly in which the drive means for rotating the eccentric adjusting sleeve has little or no backlash so that increased accuracy is obtained and the actual cutting radius is essentially the same as the indicated cutting radius.

Another object is to provide such a tool assembly in which the adjusting sleeve can be turned manually.

These and other objects and features of the invention will become apparent from the following detailed description taken in connection with the accompanying drawings which form a part of this specification, and in which:

FIG. 1 is a longitudinal section view of the tool block assembly of my invention;

FIG. 2 is a view taken on line II—II of FIG. 1;

FIG. 3 is a view taken on line III—III of FIG. 1;

FIG. 4 is a view taken on line IV—IV of FIG. 1;

FIG. 5 is a view taken on line V—V of FIG. 4;

FIG. 6 is a somewhat schematic view of a portion of FIG. 4 showing the parts in a second position; and FIG. 7 is a view, similar to FIG. 6, showing the parts in a third position.

Referring more particularly to the drawings, reference numeral 2 indicates the housing for the tool block assembly having an axial cylindrical bore 4 therethrough. A bushing 6 is fixedly mounted in bore 4. An eccentric sleeve 8 is mounted for rotation within the bushing 6 on ball bearings 10. Shank end 12 of a boring bar holder 14 is mounted on ball bearings 16 within the sleeve 8. The holder 14 does not rotate but can move axially with respect to sleeve 8. A boring bar 18 is received in bore 20 of holder 14 and clamped in place by set screw 22. A cutter 24 is mounted on boring bar 18. The axes of the holder 14 and boring bar 18 coincide with the axis of the inside surface of the adjusting sleeve 8, but these axes are off-set with respect to the outside surface of the sleeve 8. Thus, rotation of the adjusting sleeve 8 with respect to the boring bar results in an increase or decrease in the cutting radius of the tool. The parts so far described are conventional and are shown in the Gersch patent. Other details of the construction shown, except for the parts described hereinafter, are not described since they are the same and function in the same manner as in the Gersch patent and are not pertinent to the present invention.

According to my invention, I provide a clamp 26 around the rear end of sleeve 8. The clamp 26 is split and has a circular portion 28, which closely surrounds the sleeve 8, and a pair of spaced apart flanges 30 extending outwardly from the portion 28. A clamping cylinder 32 has an opening 34 for receiving the flanges 30 and a bore 36 for receiving a piston 38. Air is admitted to the rear end of piston 38 through valve 40 to move the flanges 30 together to secure the clamp 26 to sleeve 8 so that the sleeve 8 will rotate therewith. When valve 40 is positioned to shut off air under pressure and to exhaust air from the cylinder the resiliency of the clamp will cause the piston to move outwardly to release the clamp. The cylinder 32 has an arm 42 extending outwardly therefrom on the side opposite opening 34 for a purpose which will appear later. The housing 2 has spaced walls 44 providing an opening 46 for receiving the cylinder 32. A pin 48 is supported on walls 44 above the top of arm 42 and in alignment therewith. One end of a lever 50 is pivotally supported on pin 48 and a slot 52 extends from the pin 48 so as to receive arm 42. The other end of lever 50 has bifurcations 54 for supporting a pin 56. A double acting sizing cylinder 58 is mounted on top of housing 2 with its piston rod 60 extending into opening 46. An adapter 62 mounted on the end of rod 60 is received between bifurcations 54 and has an elongated slot 64 therein for receiving pin 56. Air is delivered selectively into either end of cylinder 58 and exhausted from the other end through a valve 66.

In operation, the normal positions of the parts are as shown in FIG. 4 with the pistons of both cylinders 32 and 58 in retracted position. Thus, the sleeve 8 can be rotated manually to set up the machine to bore a particular type of workpiece (not shown). When it is desired to rotate the sleeve 8 in a counter-clockwise direction, the valve 40 is first actuated to close clamp 26 on sleeve 8 and then valve 66 is actuated to introduce air to the rear end of cylinder 58, thus moving the parts to the position shown in FIG. 6 with the sleeve 8 being rotated to change the cutting radius a preset amount. Valve 40 is then actuated to release clamping pressure after which valve 66 is actuated to introduce air to the forward end of cylinder 58, thus returning all parts to their normal position. If necessary this operation can be repeated until the desired cutting radius is obtained. Once the desired setting is obtained it is generally possible to machine a large number of workpieces before further adjustment is necessary.

When rotating the sleeve 8 in a clockwise direction, valve 66 is first actuated to supply air to the rear end of cylinder 58 so as to move the parts to the position shown in FIG. 7. The valve 40 is then actuated to clamp the clamp 26 to sleeve 8 after which valve 66 is actuated to move the lever arm back to its original position, thus turning sleeve 8 in a clockwise direction. The clamp 26 is then released to complete the cycle. Further adjustment may be made in the same manner.

While manual operation of the valves has been described, it will be apparent that the operation may be made automatic as is common in the art.

Although the invention has been shown in connection with certain specific embodiments, it will be readily apparent to those skilled in the art that various changes in form and arrangement of parts may be made to suit requirements without departing from the spirit and scope of the invention.

I claim:

1. In apparatus having a housing, a rotatable eccentric sleeve mounted in said housing, and a tool mounted on the axis of the internal surface of said eccentric sleeve; improved means for rotating said eccentric sleeve to vary the cutting radius of said tool comprising a clamp surrounding a portion of said eccentric sleeve, fluid means for moving said clamp between operative and inoperative positions and fluid means for rotating said eccentric sleeve about its axis when said clamp is in operative position.

2. Apparatus according to claim 1 wherein said clamp includes a cylindrical portion surrounding a portion of said eccentric sleeve at the end opposite said tool and a pair of spaced flanges extending outwardly from said cylindrical portion, and said fluid means for moving said clamp includes means for moving said flanges toward each other to clamp said cylindrical portion on said sleeve.

3. Apparatus according to claim 2 wherein said fluid means for moving said clamp includes a clamping cylinder having an opening for receiving said flanges and a bore communicating with said opening and having its axis generally normal to said flanges, a piston mounted in said bore and movable from a rearward position where the clamp is in inoperative position to a forward position where said flanges are moved toward each other to lock the cylindrical portion to said sleeve, and fluid means for moving said piston in said bore.

4. Apparatus according to claim 3 wherein said fluid means for rotating said eccentric sleeve about its axis includes an arm extending outwardly from said clamping cylinder away from said flanges, and means for moving said arm about the axis of said cylindrical portion of said clamp.

5. Apparatus according to claim 4 wherein said means for moving said arm includes a sizing cylinder, and means for supplying fluid selectively to opposite ends of said sizing cylinder.

6. In apparatus having a housing, a rotatable eccentric sleeve mounted in said housing, a tool holder mounted in said sleeve with its axis coinciding with the axis of the internal surface of said sleeve, the axis of the external surface of said sleeve being parallel to but spaced from the first named axis, means mounting a tool on the forward end of said tool holder; improved means for rotating said eccentric sleeve to vary the cutting radius of said tool comprising a clamp having a cylindrical portion surrounding a portion of said eccentric sleeve spaced from said tool and a pair of spaced flanges extending outwardly from said cylindrical portion, a clamping cylinder having an opening for receiving said flanges and a bore communicating with said opening and having its axis generally normal to said flanges, a piston mounted in said bore and movable from a rearward position where the clamp is in inoperative position to a forward position where said flanges are moved toward each other to lock the cylindrical portion to said sleeve, fluid means for moving said piston in said bore, an arm extending outwardly from said clamping cylinder away from said flanges, a pin mounted on said housing with its axis parallel to the axes of said sleeve, a lever having one end pivotally supported on said pin and a slot for receiving said arm on said cylinder, a sizing cylinder mounted on said housing with its axis substantially parallel to the plane through the axis of said pin and said cylindrical portion of said clamp, a piston rod extending from said sizing cylinder on the side toward said clamping cylinder, a second pin mounted on the second end of said lever parallel to said first pin, an adapter mounted on the end of said piston rod and having an elongated slot for receiving said second pin, and means for supplying fluid selectively to opposite ends of said sizing cylinder to rotate said clamp about its axis whereby said eccentric sleeve is also rotated when said clamp is in operative position.

* * * * *